Oct. 17, 1961  D. S. COLBURN  3,005,144
REGULATED POWER SUPPLY
Filed April 18, 1958  3 Sheets-Sheet 1
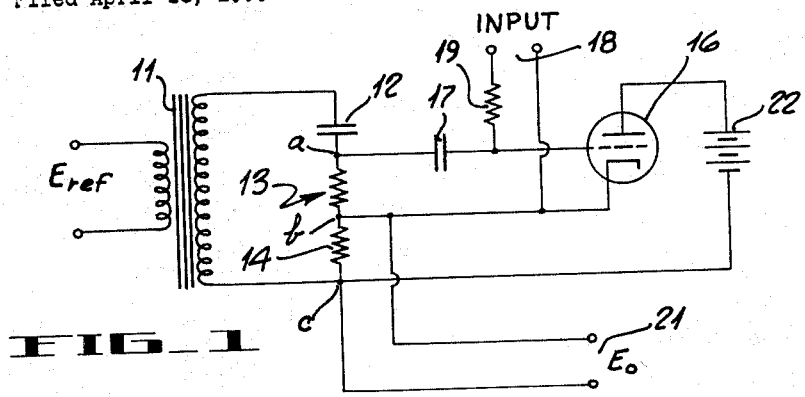
FIG_1
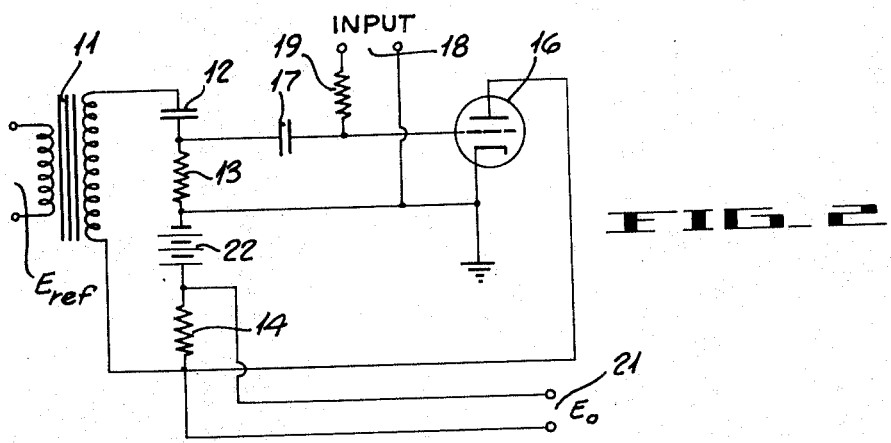
FIG_2
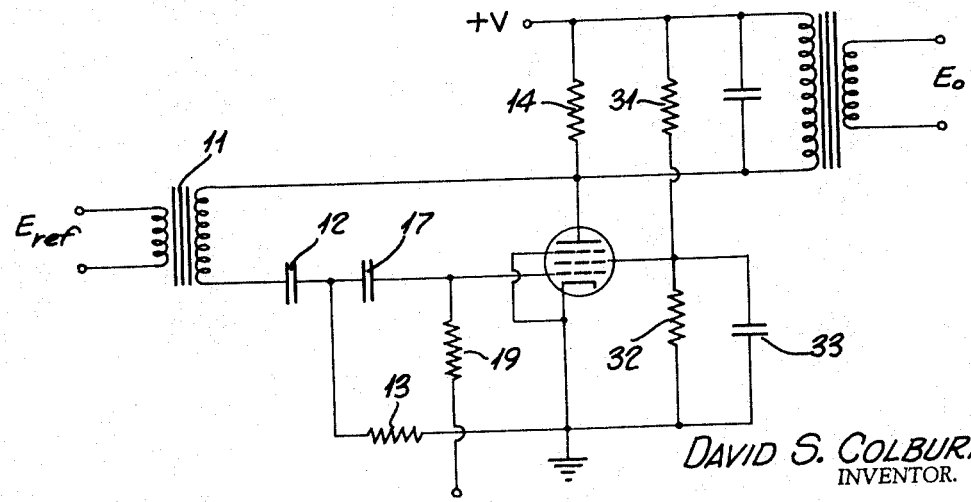
FIG_3
DAVID S. COLBURN
INVENTOR.
BY *Flehr & Swain*
ATTORNEYS Oct. 17, 1961

D. S. COLBURN 3,005,144

REGULATED POWER SUPPLY

Filed April 18, 1958

DAVID S. COLBURN
INVENTOR.

BY
ATTORNEYS

3,005,144
REGULATED POWER SUPPLY
David S. Colburn, Palo Alto, Calif., assignor to Beckman Instruments, Inc., a corporation of California
Filed Apr. 18, 1958, Ser. No. 729,296
3 Claims. (Cl. 321—18)

This invention relates generally to a regulated power supply and more specifically to a thyratron-controlled regulated power supply.

In order to provide adjustable regulated D.-C. power, in certain ranges of voltages and currents, the thyratron is the most economical element. For the circuit to regulate, means must be provided for utilizing a D.-C. error signal derived from the output to control the firing angle of the thyratron.

The firing angle of a thyratron may be controlled by controlling the phase of the grid voltage. This has been achieved in the prior art by adjustment of a variable resistor which is connected in a phase shifting network. The firing angle has also been controlled by employing an A.-C. signal of fixed phase and amplitude which is superimposed on a variable D.-C. voltage. Variation of the D.-C. voltage serves to vary the firing angle. However, control cannot be achieved over the full 180°. For relatively large firing angles, the control becomes unstable.

It is a general object of the present invention to provide a phase controlled thyratron in which the phase of the grid signal is controlled by an electrical signal.

It is another object of the present invention to provide a grid controlled thyratron circuit which includes a phase shifting network having an electrically controlled resistance element.

It is another object of the present invention to provide a thyratron controlled regulated power supply in which the phase of the power is controlled by a phase shifting network including variable resistance means which includes the transconductance of an electron tube.

It is a further object of the present invention to provide a phase shift network for use in a thyratron regulated power supply in which an electron tube is used as the variable resistor and in which the D.-C. error signal is employed to control the transconductance of the tube to thereby control the phase shift.

These and other objects of the invention will become more clearly apparent from the following description when taken in conjunction with the accompanying drawing.

Referring to the drawing:

FIGURE 1 shows a phase shifting network in accordance with the invention;

FIGURE 2 shows another embodiment of the invention in which the D.-C. control and plate supply voltages for the network have a common ground;

FIGURE 3 shows another embodiment of the invention which includes a pentode in the network.

Figure 4A:
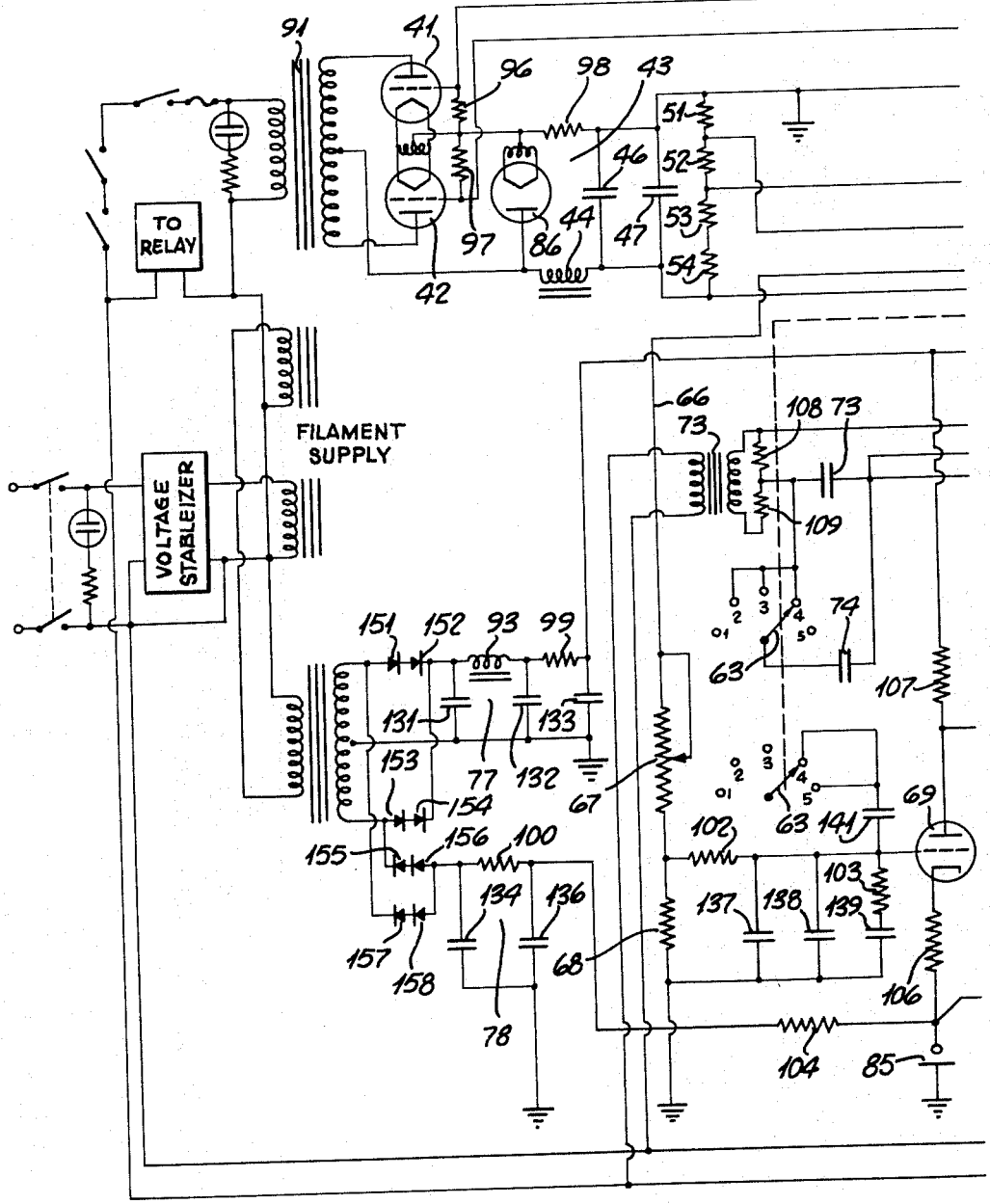
FIGURE 4A–B shows a circuit diagram of a regulated power supply in accordance with the invention.

Referring to FIGURE 1, the variable resistance in the phase shift network is achieved by the use of an electron tube connected as a cathode follower. In the circuit, the resistance in the phase shift network connected in the secondary of the transformer varies with the $g_m$ of the tube. The reference signal $E_{ref}$ is applied to the primary of the transformer 11. The secondary of the transformer is connected to a series network which includes the capacitor 12, the resistor 13, and the parallel combination of resistor 14 and the plate to cathode path of the vacuum tube 16. The reference voltage $E_{ref}$ has a fixed phase with respect to the voltage applied between plate and cathode of the thyratrons, preferably the voltages are in phase. The voltage which appears across the "A.-C." resistor 13 is applied between the grid and cathode of the tube 16 through a capacitor 17. Superposed upon this A.-C. is the D.-C. error (control) signal which is applied at the terminals 18. An isolating resistor 19 may be provided to isolate the source of control signal from the phase shift network. Suitable plate voltage 22 is applied to the circuit.

The transconductance of the tube 16 will vary in accordance with the D.-C. signal applied between the grid and cathode. Thus, the resistance in the path including the resistor 14 and vacuum tube 16 will vary, and the phase of the voltage across the resistor 14 will vary. The output voltage is obtained across the resistor 14 and applied to the grids of the thyratrons. The voltage is shown as $E_0$ at terminals 21.

The following explanation may aid in understanding the operation of the circuit: The terminals of the phase shift circuit are labeled $a$, $b$ and $c$ as indicated.

$$Iab = Iac = \frac{Eab}{R_{13}}$$

(assuming that the load impedance of the circuit connected to terminals 21 is relatively high, which is true for the grid to cathode circuit of a thyratron). As the $g_m$ of the tube is increased, the cathode follower action decreases $Eab$. Hence the current $Iab$ decreases and the effective resistance $$\frac{Eac}{Iac}$$

is increased, and the phase difference between $E_{ref}$ and $E_0$ is decreased. The effective resistance is greatest when $g_m$ is highest. Bias voltage (direct current) between cathode and control grid varies $g_m$. Thus, it is seen that the phase shift is controlled by a D.-C. control signal.

In the phase shift network of FIGURE 2, the power supply is connected in series with the cathode resistor between it and the cathode. This has no effect on the operation of the circuit but allows the D.-C. control signal and plate supply voltage source to have a common ground. The elements of the circuit are as previously described and, therefore, carry the same reference numerals.

In FIGURE 3, a circuit similar to that described but including a pentode tube is illustrated. A pentode is preferably employed since it has a reasonably linear relationship between $g_m$ and grid bias. The circuit includes a transformer coupled output to reject any hum from the B+ supply and to step up the voltage to a required value. The input reference signal $E_{ref}$ is applied through a transformer 11. The phase shift network includes the capacitor 12, and resistors 13 and 14 as previously described. The input is applied through an isolating resistor 19 and the A.-C. signal is capacitively coupled through the capacitor 17 to the grid of the tube. Suitable bias voltage for the screen grid is provided by the combination of resistors 31 and 32. A bypass capacitor 33 is connected in shunt between the cathode and screen grid.

Figure 4B:
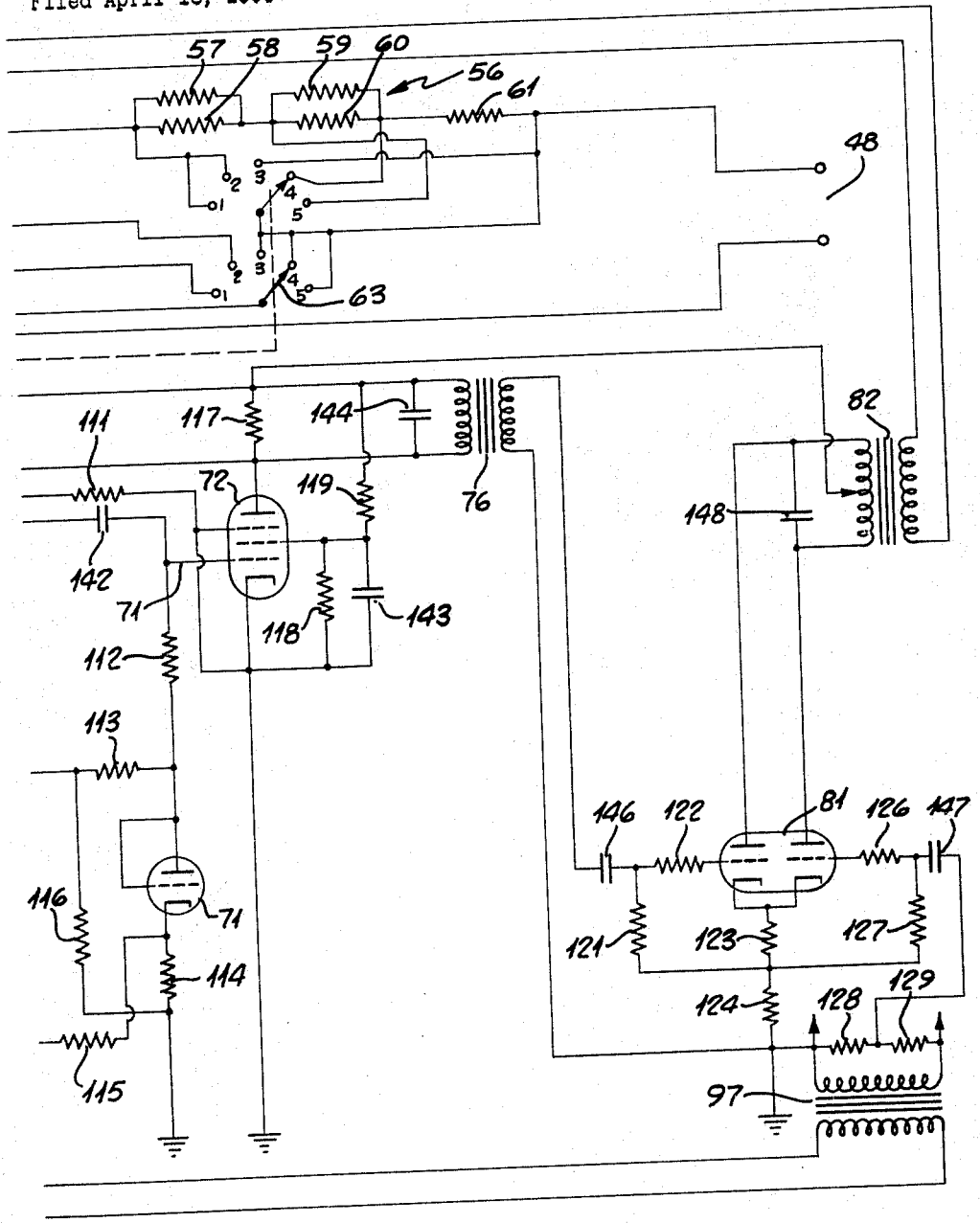

The circuit just described may be employed in a thyratron-controlled regulated power supply to provide a voltage of variable phase to the grids of thyratrons. Referring to FIGURE 4, a regulated power supply in accordance with the invention is illustrated. The power supply includes a pair of thyratrons 41 and 42 connected in a full wave rectifier circuit. The rectified signal is applied to a filter 43 which includes the inductor 44 and capacitors 46 and 47. The rectified signal is available at the output terminals 48. The series combination of resistors 51, 52, 53 and 54 connected across the output lines provides means for sampling the output voltage to derive an error (control) signal for application to the phase shift network which controls the firing angle of the thyratrons. Alternatively, the output current may be regulated and means for accomplishing this include the series parallel combination of resistors indicated generally by the reference numeral 56. The combination includes the series combination of parallel resistors 57 and 58, parallel resistors 59 and 60, and resistor 61. The voltage drop across these resistors is sampled and serves as the error signal for application to the phase shift network which controls the firing angle of the thyratrons. Thus, by switching the switch 63 to the terminals 1 and 2, a regulated output voltage is obtained, while by switching the switch to terminals 3, 4 and 5, a regulated output current is obtained.

The error signal is applied along the line 66 through the series resistors 67 and 68 to ground. The common terminal of the resistors is connected by a network to the grid of the tube 69 which, in conjunction with the tube 71, are connected as a D.-C. amplifier for providing an amplified error signal to the grid of the tube 72. The reference voltage is applied through the transformer 73 to the grid of the tube 72.

The D.-C. voltage serves to vary the transconductance of the tube as previously described.

The combination of rectifiers and filter 77 provides plate voltage for the tubes 69 and 72, and the combination of rectifiers and filters 78 provides a negative supply voltage for the cathodes of the tubes 69 and 71.

The secondary of the transformer 76 is connected to the grids of the tube 81 which is connected in a balanced amplifier circuit with the plates connected across the primary of the transformer 82. A transformer 97 adds a voltage of fixed phase to the grids of the tube 81 so that the output voltage has a reasonably constant amplitude over range of phase shift. The secondary terminals of the transformer 82 are connected to the grids of the thyratrons 41 and 42. An A.-C. voltage of varying phase with respect to the input voltage is applied to the grids thereby controlling the output current of the thyratron combination. Depending upon whether voltage or current is sampled, a regulated output voltage or output current is obtained.

A regulated power supply was constructed in accordance with the circuit diagram of FIGURE 4 and the various components had the following values:

Thyratrons: 41 and 42 _____ 5557
Tubes:
 69, 71 _____ 12AX7
 72 _____ 6AH6
 81 _____ 12AT7
 85 _____ OB2
 86 _____ 866A
Transformers:
 73 _____ Thordarson 21FO8.
 76 _____ Triad 35A.
 82 _____ Triad A39A.
 91 _____ UTC S50.
 92 _____ Thordarson 21FO8.
 97 _____ Thordarson 21FO8.
Inductors:
 44 _____ 12 henrys, 250 milliamps.
 93 _____ 20 henrys.
Resistors:
 51 ____ohms__ 25K
 52 ____do____ 25K
 53 ____do____ 100K
 54 ____do____ 100K
 57 ____do____ 10K
 58 ____do____ 1K
 59 ____do____ 10K
 60 ____do____ 1K
 61 ____do____ 2.5K
 67 ____do____ 250K
 68 ____ohms__ 100K
 96 ____do____ 51K
 97 ____do____ 51K
 98 ____do____ 2.7
 99 ____do____ 1K
 100 ___do____ 10K
 102 _____m__ 1
 103 ___ohms__ 100K
 104 ___do____ 15K
 106 ___do____ 94K Resistors—Continued:
 107 _____m__ 1.8
 108 ___ohms__ 270
 109 ___do____ 100
 111 ___do____ 15K
 112 ___do____ 510K
 113 ___do____ 100
 114 ___do____ 3K
 115 ___do____ 220K
 116 _____m__ 1.8
 117 ___ohms__ 15K
 118 ___ohms__ 51K
 119 ___do____ 24K
 121 ___do____ 510K
 122 ___do____ 1K
 123 ___do____ 220
 124 ___do____ 3.9K
 126 ___do____ 1K
 127 ___do____ 510K
 128 ___do____ 240
 129 ___do____ 390
Capacitors:
 46 _____mf__ 2
 47 _____mf__ 2
 73 _____mf__ .01
 74 _____mf__ .05
 131 _____mf__ 20
 132 _____mf__ 20
 133 _____mf__ 20
 134 _____mf__ 20
 136 _____mf__ 10
 137 _____mf__ .05
 138 _____mf__ .33
 139 _____mf__ 3.0
 141 _____mf__ .68
 142 _____mf__ 1
 143 _____mf__ .22
 144 _____mf__ .05
 146 _____mf__ 1.0
 147 _____mf__ 1.0
 148 _____mf__ .03
Rectifiers: 151, 152, 153, 154, 155, 156, 157 and 158 _____ 16Y1

A circuit constructed in accordance with the foregoing provided regulated output voltages as follows: position 1, 1000–2500 volts; position 2, 500–1000 volts; and regulated output currents as follows: position 3, 20–50 milliamps; position 4, 50–100 milliamps; and position 5, 100–250 milliamps. Regulation was within 1% in the voltage ranges, and 1% in the current ranges for load and line variations.

Thus, it is seen that an improved regulated thyratron-controlled power supply is provided. A novel circuit is provided for shifting the phase of the signal applied to the grids of the thyratron whereby a sampled D.-C. error signal may be employed to control the firing angle to regulate the output voltage or current as desired.

I claim:

1. A regulated power supply including a thyratron having plate, grid and cathode elements connected to a source of A.-C. voltage and serving to form a D.-C. output, means for sampling the D.-C. output, a phase shifting network connected to receive said sampled output and to form an A.-C. control signal whose phase with respect to the A.-C. voltage is controlled by the sampled output, said phase shifting network including the secondary of a transformer connected to receive a reference voltage having a fixed phase with respect to the A.-C. voltage, a capacitor and a plurality of resistors serially connected across said transformer secondary, a vacuum tube having at least plate, grid and cathode electrodes, said grid being coupled to the junction of said capacitor and one of said plurality of resistors, said cathode being coupled to the other side of said one resistor whereby said reference voltage may be applied to the grid of said tube, a source of D.-C. voltage, said other resistor and said source of D.-C. voltage being serially connected between said plate and said cathode, means for applying a sampled output to the grid of said tube whereby the transconductance of the tube is varied to thereby vary the input resistance of said tube and the phase of the control signal with respect to the voltage, and means for applying the control signal to the grid of the thyratron.

2. A regulated power supply as in claim 1 wherein said tube is connected as a cathode follower with the output control signal being obtained across the cathode resistor.

3. A regulated power supply including a thyratron having plate, grid and cathode elements adapted to be connected to a source of A.-C. voltage and serving to rectify the same to form a D.-C. voltage, means for sampling the output D.-C. voltage, a phase shifting network connected to receive the sampled output and form an A.-C. control signal whose phase with respect to the A.-C. signal is controlled by the sampled output, said phase shifting network including the secondary of a transformer connected to receive a reference voltage having a fixed phase with respect to the A.-C. voltage, a capacitor and a plurality of resistors serially connected across said transformer secondary, a vacuum tube having at least a plate, a grid and a cathode, the grid of said vacuum tube being coupled to the junction of said capacitor and one of said resistors, the cathode of said vacuum tube being coupled to the other side of said one resistor, whereby said reference voltage is coupled to the grid of said vacuum tube, a source of D.-C. voltage, said other resistor and said source of D.-C. voltage being serially connected between said plate and said cathode, means for applying the sampled output to the grid of the tube whereby the transconductance of the tube is varied in response to the sampled output, the variations in transconductance serving to vary the input resistance of said tube whereby the voltage phase in the phase shifting circiut is varied, means for deriving a control signal from said phase shifting network, a balanced amplifier serving to receive the controlled signal, means for applying a voltage of fixed phase to the balanced amplifier whereby the output signal has a relatively constant amplitude over the range of phase shift, and means for applying the output of the balanced amplifier to the grid of the thyratron to control the output from the same

References Cited in the file of this patent
UNITED STATES PATENTS

| | | |
|---|---|---|
| 2,219,397 | Plebanski | Oct. 29, 1940 |
| 2,619,626 | Anderson | Nov. 25, 1952 |
| 2,766,382 | Dawson | Oct. 9, 1956 |
| 2,899,629 | Kubler | Aug. 11, 1959 |

OTHER REFERENCES

Reference Data for Radio Engineers, 4th edition; published by the International Telephone and Telegraph Corportion (January 1957), pages 444 and 445 relied on.